US008302139B2

(12) United States Patent
Harris

(10) Patent No.: US 8,302,139 B2
(45) Date of Patent: Oct. 30, 2012

(54) VIDEO-ON-DEMAND AND TARGETED ADVERTISING

(75) Inventor: Frederick B. Harris, San Jose, CA (US)

(73) Assignee: OpenTV, Inc., San Francisco, CA (US)

( * ) Notice: Subject to any disclaimer, the term of this patent is extended or adjusted under 35 U.S.C. 154(b) by 1468 days.

(21) Appl. No.: 10/652,261

(22) Filed: Aug. 29, 2003

(65) Prior Publication Data
US 2004/0045028 A1 Mar. 4, 2004

Related U.S. Application Data

(60) Provisional application No. 60/406,785, filed on Aug. 29, 2002.

(51) Int. Cl.
*H04N 7/173* (2011.01)
(52) U.S. Cl. ........ 725/94; 725/32; 725/33; 725/34; 725/35; 725/36; 725/37; 725/40; 725/41; 725/43; 725/61; 725/86; 725/87; 725/88; 725/89; 725/90; 725/91; 725/92; 725/93; 725/95; 725/96; 725/97; 725/98; 725/99; 725/100; 725/101; 725/102; 725/103; 725/104; 370/486; 370/487; 709/219
(58) Field of Classification Search ........ 725/40–41, 725/43, 86–104, 32–37, 61; 709/219, 217; 370/486–487
See application file for complete search history.

(56) References Cited

U.S. PATENT DOCUMENTS

| 4,429,385 | A | | 1/1984 | Cichelli et al. |
| 5,220,420 | A | | 6/1993 | Hoarty et al. |
| 5,357,276 | A | | 10/1994 | Banker et al. |
| 5,404,505 | A | | 4/1995 | Levinson |
| 5,555,407 | A | | 9/1996 | Cloutier et al. |
| 5,592,551 | A | * | 1/1997 | Lett et al. ............ 380/211 |
| 5,861,906 | A | * | 1/1999 | Dunn et al. ............ 725/87 |
| 5,945,987 | A | * | 8/1999 | Dunn ............ 715/718 |
| 6,144,402 | A | * | 11/2000 | Norsworthy et al. ...... 725/109 |
| 6,177,930 | B1 | * | 1/2001 | Chernock et al. ........ 715/716 |

(Continued)

FOREIGN PATENT DOCUMENTS
EP 1173011 1/2002
(Continued)

OTHER PUBLICATIONS

Toshiro Yoshimura, et al.: "Data Broadcasting System Using a Direct Broadcast Satellite in Japan"; NHK Laboratories Note, NHK Technical Research Laboratories. Tokyo, JP, No. 411, 1993, pp. 1-18, XP000361028; ISSN: 0027-657X.

(Continued)

*Primary Examiner* — Jason Salce
(74) *Attorney, Agent, or Firm* — Schwegman Lundberg & Woessner, P.A.

(57) ABSTRACT

A method and apparatus for aggregating the data for a plurality of individualized programs into a single channel, and allocating the channel bandwidth as-needed for provision of short video programs on an "on demand" basis, so that the total bandwidth required to provide the individualized channels and associated video clips is substantially reduced. Also provided is a real-time, single-user-targeted individualized advertising associated with the viewer selection that personalizes the user's iTV experience. The advertisements are targeted in real-time based on an immediate interest revealed by the user in a search request for content. Short duration videos are provided so as not to over-tax the individualized "on demand" channel's limited bandwidth.

23 Claims, 4 Drawing Sheets

U.S. PATENT DOCUMENTS

| | | | |
|---|---|---|---|
| 6,308,007 B1 | 10/2001 | Iwasaki | |
| 6,378,130 B1* | 4/2002 | Adams | 725/95 |
| 6,427,238 B1* | 7/2002 | Goodman et al. | 725/136 |
| 6,453,471 B1* | 9/2002 | Klosterman | 725/41 |
| 6,473,902 B1 | 10/2002 | Noritomi | |
| 6,502,139 B1 | 12/2002 | Birk et al. | |
| 6,622,305 B1 | 9/2003 | Willard | |
| 6,658,661 B1* | 12/2003 | Arsenault et al. | 725/54 |
| 6,668,377 B1* | 12/2003 | Dunn | 725/92 |
| 6,675,385 B1* | 1/2004 | Wang | 725/39 |
| 6,727,955 B2* | 4/2004 | Pereboom | 348/468 |
| 6,859,839 B1* | 2/2005 | Zahorjan et al. | 709/231 |
| 6,976,268 B2* | 12/2005 | Courtney et al. | 725/134 |
| 7,032,028 B2* | 4/2006 | Clay et al. | 709/238 |
| 7,069,572 B2* | 6/2006 | Stalker | 725/34 |
| 7,096,484 B2* | 8/2006 | Mao et al. | 725/52 |
| 7,134,133 B1* | 11/2006 | Wugofski | 725/39 |
| 2001/0049826 A1* | 12/2001 | Wilf | 725/120 |
| 2002/0016969 A1* | 2/2002 | Kimble | 725/87 |
| 2002/0059608 A1* | 5/2002 | Turner | 725/53 |
| 2002/0073428 A1* | 6/2002 | Gurevich et al. | 725/86 |
| 2002/0108127 A1* | 8/2002 | Lew et al. | 725/142 |
| 2002/0133826 A1* | 9/2002 | Ohyama | 725/87 |
| 2002/0147984 A1 | 10/2002 | Tomsen et al. | |
| 2003/0009763 A1* | 1/2003 | Crinon et al. | 725/92 |
| 2003/0208761 A1* | 11/2003 | Wasserman et al. | 725/53 |
| 2004/0034873 A1* | 2/2004 | Zenoni | 725/135 |
| 2004/0133907 A1* | 7/2004 | Rodriguez et al. | 725/14 |
| 2005/0076378 A1* | 4/2005 | Omoigui | 725/87 |

FOREIGN PATENT DOCUMENTS

| | | |
|---|---|---|
| WO | 95/28799 | 10/1995 |
| WO | WO 9826596 | 6/1998 |
| WO | WO 9857273 | 12/1998 |
| WO | WO 9951030 | 10/1999 |
| WO | WO 99/65230 | 12/1999 |
| WO | WO 0024195 | 4/2000 |
| WO | WO 0039947 | 7/2000 |
| WO | WO 0078031 | 12/2000 |
| WO | WO 0135660 | 5/2001 |
| WO | WO 0143425 | 6/2001 |
| WO | WO 02/39745 | 5/2002 |
| WO | WO 0239745 | 5/2002 |

OTHER PUBLICATIONS

International Search Report International Application No. PCT/US03/27196; International Filing Date Aug. 29, 2003.

Notice of the Reason for Refusal; Translation; Patent Application No. 2004-531975; Mailing Date: Nov. 6, 2007.

Patent Application Laid-open No. 2001-245272 of Sep. 7, 2001 (same as US 2003/0191815 A1).

Patent Application Laid-open No. 2002-118812 of Apr. 19, 2002.

Patent Application Laid-open No. 2002-64795 of Feb. 28, 2002.

Final Decision of Rejection mailed Apr. 22, 2008; Patent Application No. 2004-531975.

Patent Application Laid-open No. 2001-344204 of Dec. 14, 2001 (same as US 2003/0031186 A1).

Patent Application Laid-open No. 2001-309344 of Nov. 2, 2001.

Notice of Reason for Refusal; Patent Application No. 2008-212950 mailed Jan. 25, 2011.

Nicholls, Rob; "Digital Television—Will it Combat the Challenges of New Media?"; Casbaa, Singapore; Nov. 15-17, 2000 by Gilbert & Tobin.

* cited by examiner

VIDEO-ON-DEMAND AND TARGETED ADVERTISING

CROSS REFERENCE TO RELATED APPLICATIONS

This application claims benefit of priority to Provisional Application Serial No. 60/406,785 filed Aug. 29, 2002.

BACKGROUND OF THE INVENTION

1. Field of Invention

The present invention relates generally to an interactive television environment and, more specifically, to the management of channel bandwidth in video on demand and targeted advertising in an interactive television environment.

2. Background of the Related Art

Interactive television broadcasters, network operators, and multiple system operators reach a large and diverse demographic of users via broadcasts over satellite, terrestrial, and high-speed cable networks. These various operators, however, face several problems delivering individualized and localized content to individual viewers. Each operator must strike a balance between their desire to convey individualized content versus allocation of the limited bandwidth available to them. Because there is insufficient bandwidth available in the broadcast to dedicate a specially designed channel for each user, tailoring a broadcast to an individual is problematic.

Small, local cable/terrestrial operators desire to distinguish their product offerings by promoting their individuality, that is, the ability to reach and appeal to the little guy, the individual user on a personal level. Typically, broadcast data is presented as a one-to-many presentation in a broadcast carousel. In the typical broadcast scenario, every user's set-top-box (STB) receives and conceivably views whatever is broadcast in the carousel. Selectivity or limitation of availability to select authorized individuals or groups is typically provided by Conditional Access (CA) mechanisms which restrict the availability of broadcast data to authorized users. However, CA generally requires additional hardware and is not particularly well-suited for selection of personalized or individualized content from the broadcast. Further, use of CA mechanisms may not address the bandwidth limitations associated with individualized broadcasts.

Individualized content may also be desirable for interactive television applications. Catalog-type content, such as automobiles for sale, real estate listings, and restaurant guides, however, may be extremely local in nature. Most users or viewers are only interested in cars and restaurants in their local region. Often times the location of content of interest will be located only a few miles from a viewer's home. Thus, a broad coverage area could possibly be divided into numerous local regions each requiring a separate dedicated broadcast channel. Moreover, a plurality of special interest channels may be required for each region.

In order to address multiple local regions, a large broadcaster serving thousands of viewers would have to provide a multitude of individualized channels for the various localities and interest groups being served in order to accommodate the broadcaster's entire subscriber base of viewers. For example, a broadcaster that supplies five major urban centers may require five dedicated channels for a "used car" channel or program that is localized for each area of the five areas. These five channels would permanently reduce the available bandwidth by five channels even when none of the five channels are being used or viewed. Moreover, if short videos or pictures are included in the dedicated channel, the permanent dedicated bandwidth for each channel would be excessive and would cut into an already limited bandwidth availability. Thus, there is a need for a method and apparatus for providing individualized local content without utilizing excessive dedicated bandwidth.

There is also a desire to provide localized, one-to-one targeted individualized advertising. Broadcast advertisements are generally pushed or broadcast indiscriminately to subscribers at large. In this push marketing scenario, every viewer receives the same advertisements whether or not they show an interest in the product. Advertising, however, is generally believed more effective when it is delivered to those who have already expressed an interest in a particular area. While developing a profile of viewing habits and purchases of end users or viewers may enable advertisers to deliver targeted messages, determining and storing the viewer's interests in a profile can be offensive to privacy-minded viewers and may be deemed an invasion of their privacy. Thus, there is a desire to provide targeted advertising in a manner which is more acceptable to privacy-minded users.

SUMMARY OF THE INVENTION

A method and apparatus are contemplated for providing individualized channels and associated video clips. In one embodiment, data corresponding to a plurality of individualized programs is aggregated into a single channel and channel bandwidth is allocated as needed for provision of short video programs on an "on demand" basis. Bandwidth allocation is performed in such a manner that the total bandwidth required to provide the individualized channels and associated video clips may be reduced. Also contemplated is the provision of real-time, single-user-targeted advertising content that personalizes the user's iTV experience. Short duration videos lasting 5 to 10 seconds may be used so as not to over-tax the individualized "on demand" channel's limited bandwidth.

Also contemplated is a method and apparatus that provides an advertisement associated with a viewer selection. The advertisements are targeted in real-time based on a recently revealed interest instead of a compiled and/or stored profile. For example, a person looking at real estate advertisements in Palo Alto, Calif. might receive an advertisement for a mortgage lender in Palo Alto. The personalized one-to-one targeted advertising may be more acceptable to privacy-conscious users. User selection related advertising makes it easier to deal with targeted advertising in real time as it does not require a storage database for user transaction history to select appropriate advertising. Thus, the embodiments described herein may be less intrusive and may be more acceptable to privacy-conscious viewers who fear losing their privacy from formulation of a transactional record of their viewing and buying habits stored in user profile data base. Transaction history may apply, however, if a different user is signed on using the viewer's identification. Moreover, user-selection-related advertising may be important in an opt out scenario where users may choose to opt out or choose not to participate in an operator's building a profile data base of its users by tracking its users' activities.

Various embodiments described herein may also enable allocating bandwidth in such a manner that it can be shared by many and may improve the efficiency of bandwidth utilization. Further, advertisements may be presented to those who have shown an immediate interest in a particular product or service, thus providing the potential for a higher degree of success in the reception of the advertiser's message and reducing the intrusion into a viewer's privacy by creating an existing database profile.

BRIEF DESCRIPTION OF THE DRAWINGS

For detailed understanding of the present invention, references should be made to the embodiments described in the below, taken in conjunction with the accompanying drawings, in which like elements have been given like numerals, wherein.

DETAILED DESCRIPTION

Figure 1:
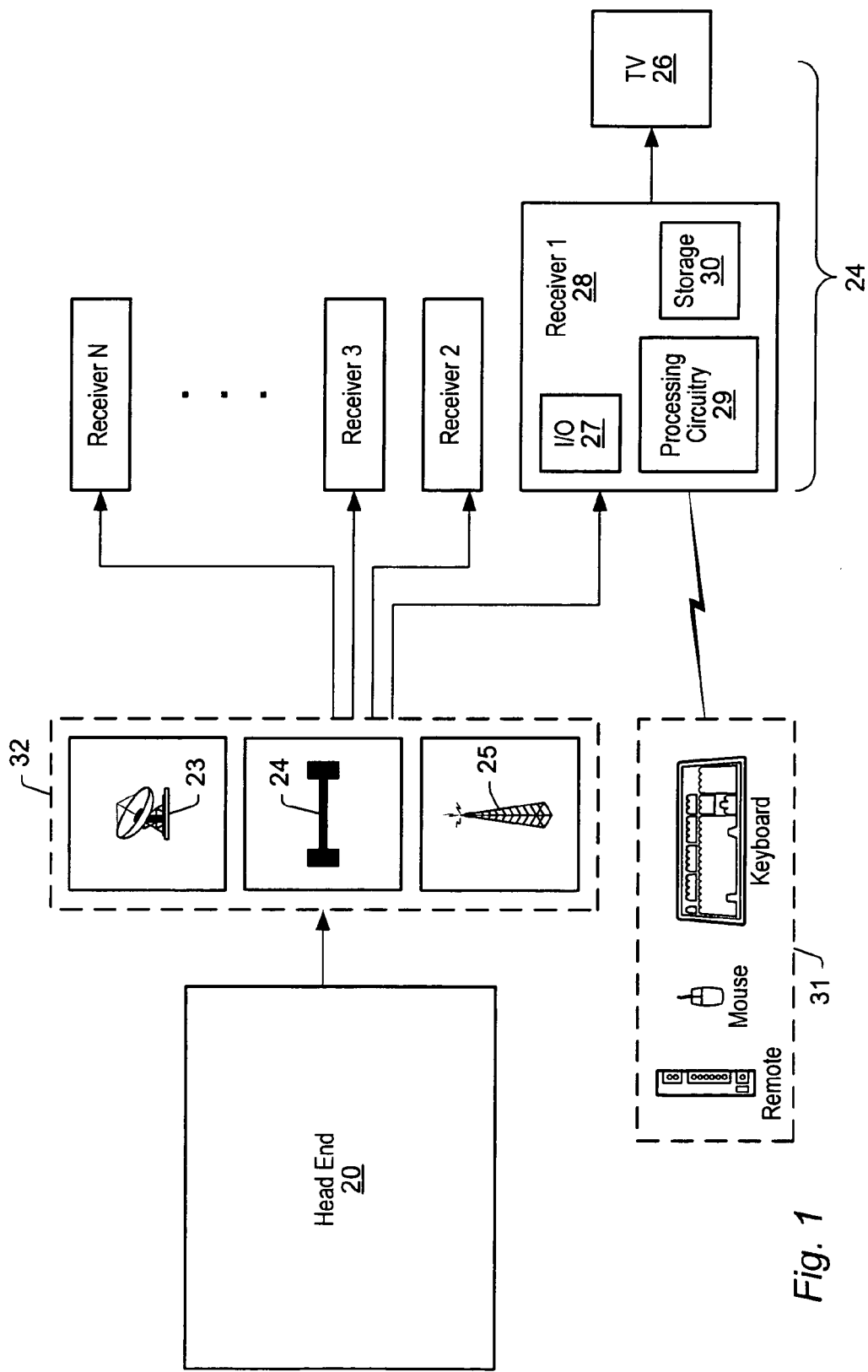
FIG. 1 is an illustration of an interactive television environment.

FIG. 1 shows a diagram illustrating the distribution of interactive television applications, television programs (audio and video) and system information (e.g., number of services, service names, event names, event schedules) from a source server to a viewer at a client device. The system includes a head end 20, which may be coupled with a video and audio device (not shown) that feeds a particular video with associated audio to the head end. The audio-video-interactive signal contains television programs or similar audio-video content, as well as interactive content such as control signals, system information, and interactive applications. In one embodiment, the video information is digitized at the head end 20 and transmitted via a suitable transmission medium 32 (such as satellite 23, a cable 24, and/or a terrestrial or multiple multi-point distribution service based system 25) to a receiving system 24, comprising a client device 28, such as a set top box, and a viewer display 26, such as a television set. The information transmitted by the head end 20 may be transmitted to the receiving system 24 in various ways. For example, the transmitted information may be sent to the receiving system 24 via a broadcast signal such as a satellite transmission. The receiving station 24 may also be configured to receive signals via a modem channel or cable. The receiving system 24 may include, for example, a television 26 connected to a set top box 28. The set top box 28 may include processing circuitry 29 and storage 30 (volatile and/or non-volatile) which perform the processing functions of the receiving station 24. In addition, the set top box may be coupled to communicate with an input device 31, such as a remote control, mouse, keyboard, or otherwise. Set top box 28 further includes I/O circuitry 27 configured to enable the STB 28 to receive and convey various types of signals, such as broadcast signals, modem signals, etc. Once information is received through the receiving antenna 30, it may be processed by the set top box 28 and displayed on the television set 26. In this manner, audio, video, and interactive data may be received and processed by the set top box 28. The signals transmitted via a broadcast carousel or modem channels embody various modules which comprise components of an interactive application. The modules may contain any type of data, such as application code, raw data, video and graphical information.

In one embodiment, a group of data modules are broadcast from a head end server to a plurality of client devices in a repeating carousel on a virtual channel dedicated to a particular topic, for example, real estate or automobiles. The data modules contain information associated with items presented for viewing on the virtual channel. A user selects the virtual channel, which presents a query menu on a client device display associated with a STB. The client device displays a "search" menu enabling a user of the client device to enter search criteria to enable the user to select modules associated with items within the user's selection criteria. For example a user may select the real estate channel. The real estate channel presents a search menu to the user to enable the user to put in a variety of search criteria or key words. The user viewing the real estate channel may input search criteria comprising "price range", "location" and "number of bedrooms" when searching for houses for sale within a particular price range and location.

The user's selection criteria may then be forwarded to the server over a back channel connection. The server identifies which modules in the broadcast carousel qualify under the user's search criteria. The server then sends a list of module numbers corresponding to these qualifying modules to the client device over the back channel connection. The client device then captures the modules associated with the qualifying module numbers from the broadcast carousel.

Figure 2:
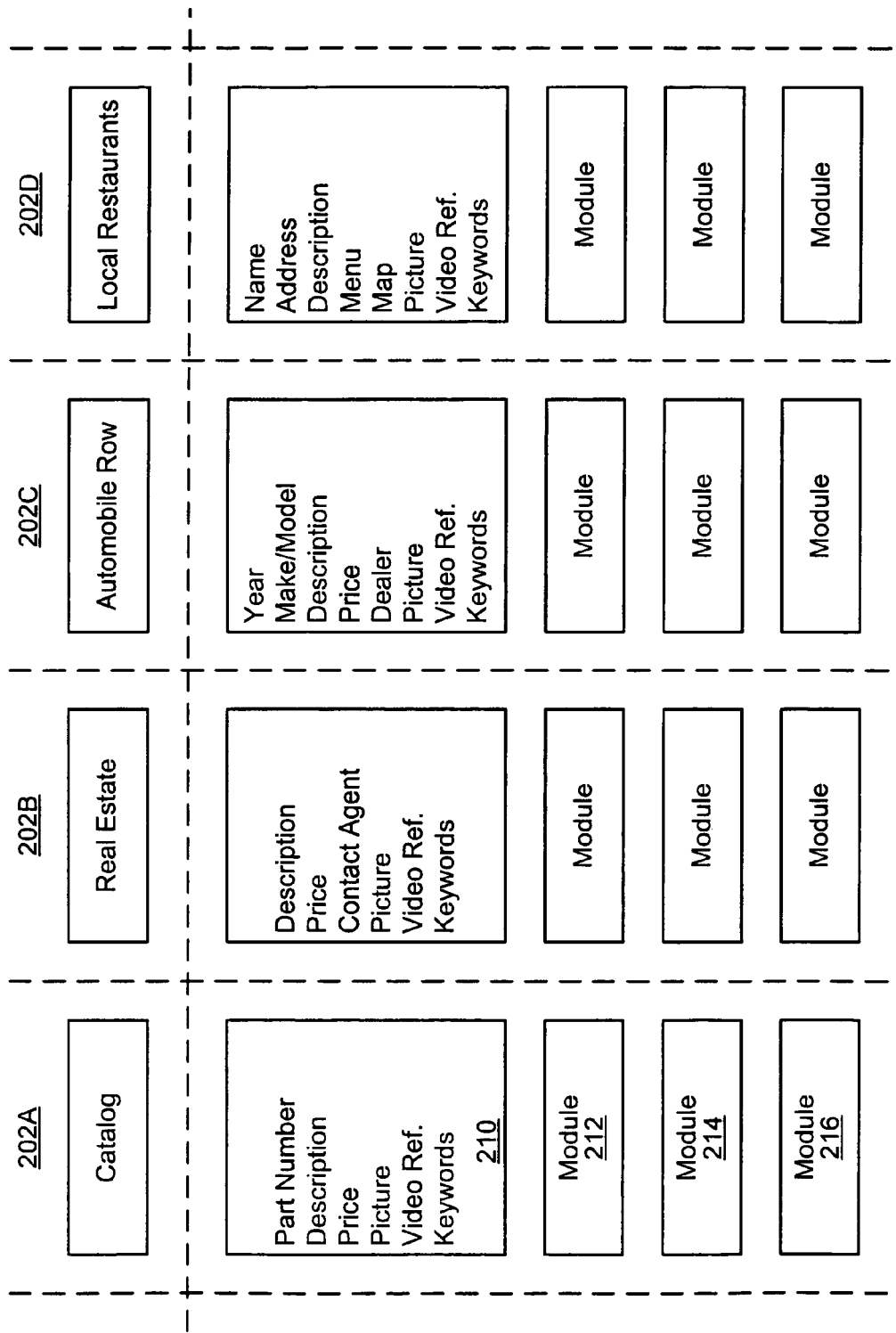
FIG. 2 is an illustration of a sort menu presented to a user in one embodiment.

In one embodiment, the modules contain data as shown in FIG. 2. FIG. 2 depicts a number of broadcast channels 202 including a Catalog channel 202A, Real Estate Channel 202B, Automobile Channel 202C, and Restaurant Channel 202D. Each channel 202 may be configured to convey data modules including audio, video, and/or application data. For example, the Catalog channel 202A, say a Sears Roebuck & Co. catalog channel, broadcasts a carousel of numbered catalog modules (210, 212, 214, 216), wherein each catalog module may contain data such as a part number, description, price, picture, keywords and a reference to an available video. The keywords associated with the modules may be used to facilitate the search of modules to identify qualifying modules under the user's search criteria. In one embodiment, a real estate channel 202B is provided which broadcasts a carousel of real estate modules, wherein each real estate module contains data comprising description, price, contact agent, picture, a reference to available video and keywords. An automobile channel 202C may be provided which broadcasts a carousel of automobile modules wherein each automobile module contains data comprising year, make, model, description, price, dealer, picture, video and keywords. Further, a local restaurant channel 202D may be provided which broadcasts restaurant modules wherein each module contains data comprising name, address, description, menu, picture, a reference to available video and keywords. Each of the channels 202 described above may be separate channels or may be combined to form fewer channels or even a single channel, depending on the bandwidth available and the desired configuration of the network operator.

In one embodiment, the videos associated with the modules are not broadcast, but are instead stripped from the modules and stored in a server database in order to conserve broadcast bandwidth. When a video associated with a selected module is requested by a user for viewing at a client device, the associated video is inserted into a selected and designated broadcast channel. The keywords may be used to identify which modules satisfy the user's qualifying search criteria.

In an alternative embodiment all channels are broadcast together and a user selects a topic from a menu. A sort menu may then be provided for searching real estate, automobiles, restaurants or some other category of information. In yet another embodiment, the modules are not initially broadcast in the server carousel, but are instead stored in the server database until selected in a search for qualifying modules under the user's search criteria. Upon selection or qualification of a module or modules pursuant to a search of modules in the database pursuant to the user's search criteria, the qualified or selected modules are inserted into the broadcast stream or sent to the client device through the back channel connection. The user then selects available video from modules that interest him and the server inserts the selected video into the broadcast stream or sends the video to the client device over the back channel. This alternative embodiment may utilize even less broadcast carousel bandwidth than circulating all of the modules all of the time in the carousel.

The modules broadcast in the carousel may contain sufficient information to pique a user's interest and inform the user as to the contents of a channel offering without demanding an inordinate amount of broadcast bandwidth at the server. Thus, continuous access to a number of individualized channel offerings may be provided to a large number of users without saturating the head end servers available broadcast bandwidth. A qualifying broadcast module, when selected from the broadcast or received over the back channel, may comprise a short description and a thumbnail picture of each item, for example, in the case of the real estate channel, each house qualifying under the user's search criteria. Embodiments may also enable a real estate channel user to enter search criteria of price, location and number of bedrooms in their local area, perhaps a certain number of miles from a given address. Keywords associated with the modules may then be used to determine which modules meet the search criteria and those which meet the criteria may be displayed to the user a few at a time. In addition, the raw data in the modules database may be searched for qualifying modules under the user's search criteria.

As mentioned, qualifying modules and data are presented to the user at the client device. When the user sees a picture or description of a house on which he wants to see a video, he selects the description or picture of the house at the client device. The client device sends a video request to the server for the video associated with the selected module number. The server queries the data base and finds the requested video associated with the selected module. In one embodiment, if the database is at the server, a table that matches module numbers with the location of the corresponding video and data is stored in the database. The server may then use the module number to locate and extract the video and/or data from the database. The server then places the video and/or data into the broadcast stream at a designated channel location and sends the designated channel location to the client device. The client device then goes to the designated channel location to access the video for viewing, or for storage for later viewing.

More than one user may request a module or video associated with a particular database item, for example, several viewers may be interested in viewing a particular house on Elm Street. In one embodiment, the video for the Elm Street house placed in the carousel when requested by the first user, and is removed from the broadcast carousel after all users who have requested the Elm Street house video have acknowledged viewing the video and released it. Alternatively, a video may be removed from the broadcast stream after a predetermined time, for example, one minute. In an alternative embodiment, the video is stored in memory associated with the client device and the client device notifies the server to remove the video from the broadcast. In yet another embodiment, the video is sent only once at a predetermined time on a designated channel. In the embodiment, the server sends a notice to the client device of the time and channel for the pending video transmission and all users who have requested the video, capture or view the video at the designated time on the designated channel location.

In one embodiment, one-to-one targeted advertisements are associated with the user's module search criteria and mixed in with videos and preliminary data modules associated with the user's search criteria. The advertisements from the server to the client device are broadcast in the carousel, sent over the back channel connection, or otherwise conveyed to the client. Thus, the advertisements are presented to the client device during preliminary data module presentation during searching and video presentation. The advertisements can be banner advertisements, pictures, audio or video inserts. For example, a particular musical accompaniment or voice over audio message can be associated with a given video or preliminary search data presentation.

Figure 3:
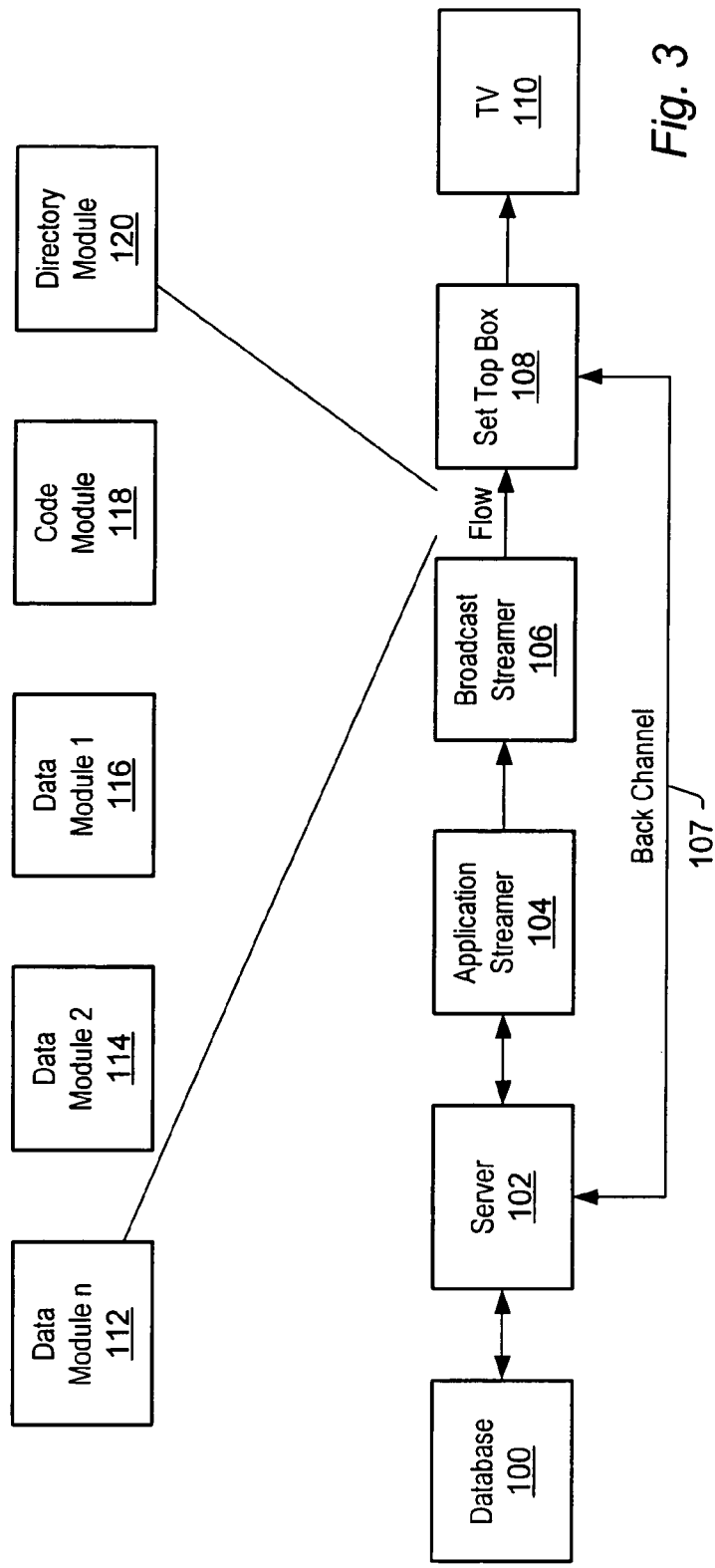
FIG. 3 is an illustration of one embodiment showing delivery of individualized video clips in response to a user request.

Turning now to FIG. 3, data, keywords, images, and videos are entered into a database 100. A server 102 including an application Streamer 104 builds modules 112, 114, 116, 118 and 120, schedules the modules for broadcast ("the flow") on an individualized channel, and designates certain tracks within the channel for video playback to individual users or user groups. Broadcast Streamer 106 multiplexes the flow into the broadcast carousel, which may comprise an MPEG Transport Stream. In one embodiment, the Application Streamer 104 stores module numbers with their respective database entries in database 100. The Network provider broadcasts (terrestrial, satellite, cable) the transport stream comprising modules 112, 114, 116, 118 and 120 to the subscriber base.

The user or viewer at the client device selects a topical channel for display on television 110. The selected channel displays menus and keywords for selection by the viewer at the television 110. The viewer views the application menu and selects, or enters, keywords from the menu displayed on television 110. The viewer selects the Submit key, which sends keywords to a server through the Set Top Box back channel (e.g., dial-up, DSL, Cable modem) back to the operator server 102. The Server 102 constructs a data base query from the key words selected by the viewer and performs a query on database 100. The Database 100 returns the names and associated module numbers of those entries matching the query. The returned names and associated module numbers are then conveyed to the STB which initiated the query. In an alternative embodiment, the server also loads these modules from the database to the carousel.

The returned module names may then be displayed in a list on the television screen 110. The viewer then makes a selection from the names returned, using the remote control associated with the set top box 108 and the television 110. The corresponding module number of the selected entry is then used to retrieve the module from the broadcast stream of modules 112, 114, 116, 118, 120. The modules may contain preliminary information regarding the viewer's selected entry.

In one embodiment, a "video option" may also be offered. In such an embodiment, a viewer may select a video from a displayed list or menu. When selected by a viewer, a video request may be routed to the server 102 via the back channel 107. A query is then formed for the video in the database 100. The server 102 services the query for the video, finds the requested video and sends the appropriate video to the Application Streamer 104 where it is inserted into one of the predefined streams/tracks set aside in the broadcast stream for insertion of user requested video. The Application Streamer 104 returns the stream/track number to the server 102. The server 102 returns the selected track number carrying the selected video, to the STB 108 application. The application in the STB 108 switches to the selected track, which causes the selected video in the selected track to be displayed on the television screen 110. After the selected video has been playing for a predetermined time, the application may, optionally, send an acknowledgement back to the server. The server 102 notifies Application Streamer 104 that the video has been seen. The Application Server 102 frees up the track unless the video on the track has been requested or is currently being viewed by another viewer.

Figure 4:
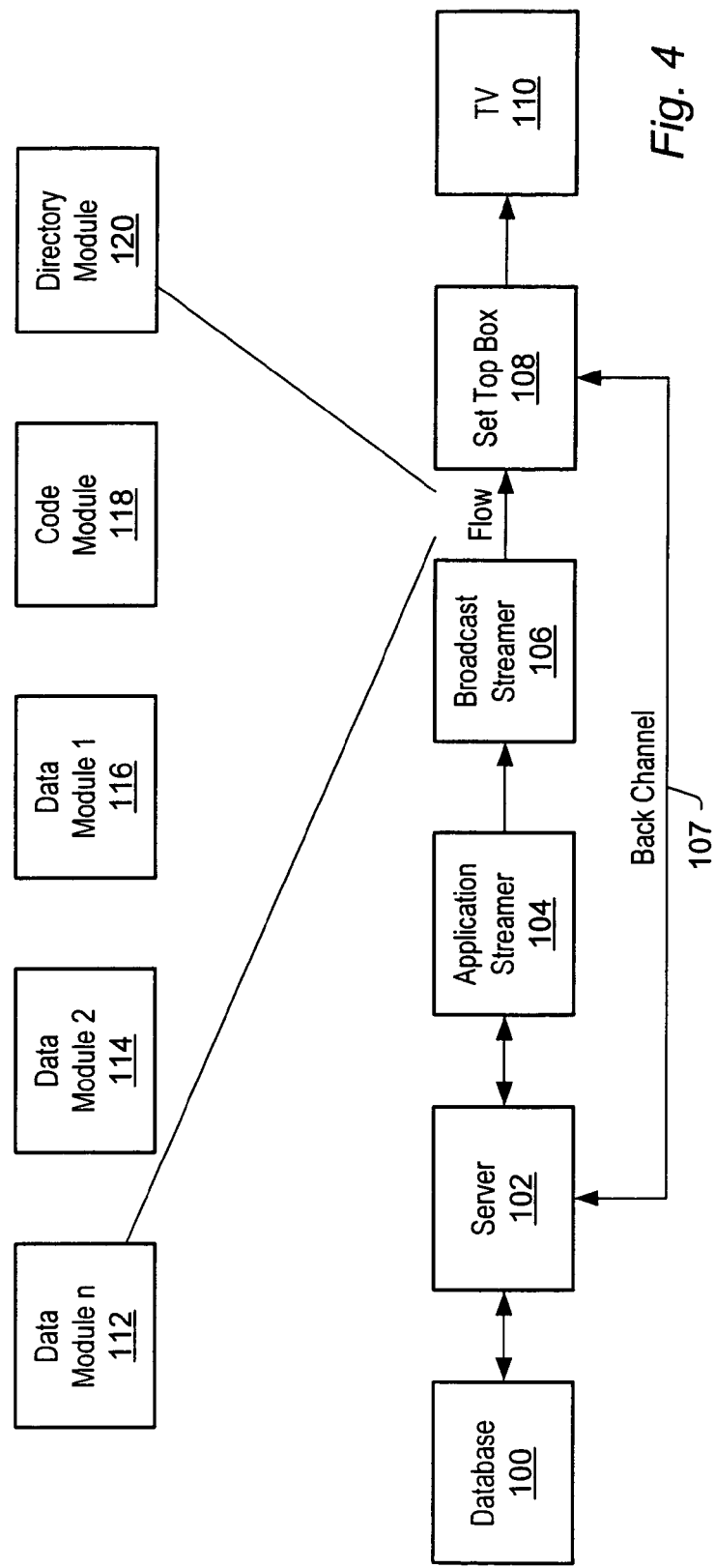
FIG. 4 is an illustration of one embodiment showing delivery of targeted advertising in response to a user request.

Turning now to FIG. 4, when the viewer submits the keywords, as in FIG. 3, this information is extracted at the Server 102. Targeted advertisement modules are selected in association with the user's search criteria and inserted into and become part of the broadcast application flow and their associated module numbers are stored in the Database 100. In an alternative embodiment, the advertisements are sent to the client device over the back channel connection between the server and the client device. The extracted viewer information is used to extract the module numbers of appropriate targeted advertising from the database 100 for this viewer. These module numbers for targeted advertising are returned with the module numbers returned as part of the Database query to the Set Top Box. The application in the Set Top Box 108 may build scenes or displays composed of the query results and the banner or other type advertisements including video and audio inserts. For example, if five entries are placed into each scene, the top entry can be a banner advertisement.

In one embodiment, for each server, an associated Application Streamer 104 component extracts all of the data for each entry, except the video and keywords. The data for each entry is assembled into individual modules, one module per entry. Each module is assigned a unique Module ID number, which is returned to the server at system "build time" and added to the database schema. A table of module ID numbers and module locations is stored in the database. All of these catalog type data modules are combined with the application code modules and sent as a stream to the Broadcast Streamer for insertion into the broadcast MPEG Transport Stream and broadcast to the network's subscriber STBs.

When a particular individualized channel is selected by the viewer, the STB loads the application from the Broadcast Stream comprising modules 112, 114, 116, 118 and 120 and presents the viewer with a list of options consisting of the appropriate keywords. The viewer selects the desired sort criteria using the remote control and the results are sent back to the respective server via the STB back channel connection to the server. The server 102 searches its database 100 and returns to the STB, via the back channel, the text descriptions and Module IDs that match the user's sort criteria. The text descriptions are displayed on the television 110 and enable the viewer to navigate and select the desired entry via a remote control associated with the television and the set top box. The appropriate Module number (1-N) is loaded from the flow or broadcast stream using the Module IDs and displays a still picture and descriptive data from the module broadcast stream that matches the viewer's search criteria.

When video is available, a "video available" notice may be displayed to the viewer and the viewer may select a video relating to one of the returned matches. The viewer requests a video and the viewer's video selection request is sent from the client device to the server 100 via the back channel 107. The server 100 feeds the requested video stored in the database to the Application Streamer, which inserts the video into an MPEG track in the ongoing broadcast carousel stream. As mentioned above, the video may also be sent via the back channel when desired. The back channel, is typically a slower bit rate connection, however, the back channel is less likely to incur a latency delay when carousel bandwidth is unavailable. Thus, a decision as to whether to send the video or data modules via the carousel or the back channel is made based on the data rate, latency and number of users on the channel and the server back channel. A video or other data item can be marked for urgent, routine or background delivery to enable offloading delivery to less urgent requests to slower delivery media such as a back channel or post pone delivery to a off peak time whenever the server can schedule delivery. Communication between an STB and broadcaster may also be accomplished via Internet or any other suitable communication channel.

The Application Streamer returns the channel location or Track ID used back to the server, which forwards the channel location or Track ID to the application in the client device or STB over the back channel. The application switches to the indicated track in the MPEG Transport Stream and "plays" the video track on the client device display or TV 110. The STB then sends an acknowledgement back to the server 100, which frees the track for reuse by removing the video from the broadcast carousel. If a second user requests the same video during this period while the video has been selected by a first user and inserted into the carousel, the track will be freed after the server receives the last acknowledgement from the second user or upon occurrence of a fixed time out delay.

In one embodiment a set top box (STB), such as the DCT-2000, which is not equipped with an integrated browser may be used. Channel broadcast bandwidth and the anticipated load during the "busy hour" dictates the number of tracks and broadcast bit rate and the size/length/compression requirements for the video. In embodiments where a video insertion component such as OpenStreamer™ is not available, then most or all of the data items may be made available, except for the video option—unless the video is sent to the client device from the server over an alternative channel, such as the back channel. A tool kit such as the OpenTV™ SDK or OpenAuthor™ may be used to create the application and the individual modules of the embodiments described herein. The assigning of Module IDs may be added to the build code for the system softwareand sent to the server for inclusion in the database. In this scenario, any change in content (i.e., a new home listing) initiates a new build.

In one embodiment, the Server 100 receives the viewer's search criteria from the client device and thus is the basis for the provision of one-to-one targeted advertising. For example, when a viewer is looking for a restaurant and selects as his search criteria, "Chinese, Mountain View, $$", the server returns corresponding module IDs or module numbers to the client device. Knowledge that the user has an immediate interest in Chinese food enables the extraction of advertising banners, discount coupons or other adverting inserts or incentives for Chinese restaurants in the carousel or and display them on screen along with the database of keyword "hits." The banners or other advertising may contain alternative related products, services, venues and discount coupons to drive business to an advertiser's place of business. For example, if the STB received 20 hits and displayed the first 5 of 20 items on a page, each page displays a different targeted one-to-one advertisement. These advertisements may be fee-based and paid for by advertisers represented in the one-to-one advertisements. The one-to-one advertisements may also be "tiered" based on the price. A higher price paid by an advertiser places the advertisement in a more visible position, for example, the top of the first page. A lesser price relegates the advertisement to less visible pages found later on in the display at the client device. The targeted advertising generated from association with the viewer's search query on a remote server as opposed to searching a user profile of historical viewing and purchasing habits have been held locally on a set top box associated memory. The fact that the query results are used to retrieve advertising from the broadcast or back channel connection provides user-targeted one-to-one advertisements of immediate interest to the user.

The Application Streamer 104 component may extract all of the data for each entry, except for the video and keywords, from the database server. The data for each entry is then converted into modules. In one embodiment, one module is created per entry. Each module is assigned a unique Module ID number, which is returned to the server and added to its respective data entry in the database. All of the modules are then combined with the application code modules and sent as a stream to the Broadcast Streamer 106 for insertion into the broadcast carousel MPEG Transport Stream.

In one embodiment, the STB or client device loads the application for a dedicated topical channel and presents the viewer at the client device with a list of sort options based on the type of content. A restaurant application may present for viewing at the client device, a column of food types (Italian, Chinese, French, etc.), a column of locations (Mountain View, Palo Alto, Sunnyvale, etc.), estimated costs ($, $$, $$$, etc.). The viewer selects the desired sort option criteria using the remote control associated with the client device or set top box and the selected criteria are sent back to the server (e.g, via the STB's back channel). In one embodiment, a list of choices are presented for each sort option which also enables the user to enter custom data or a data range for a sort option. For example, when the price option is selected for a house, a list of price ranges are presented and/or a fill in the blank for the user to enter his own unique selection for a price range. A representative list of price ranges may include "under $100,000", "$100,000-$250,000", "$250,000-$500,000" and "$500,000-$1,000,000." The user may also enter his own price range, for example, "$750,000-$1,250,000."

The server receives the user's search criteria, searches the database based on the viewer's search criteria, and returns qualifying modules to the STB or client device, via the back channel or broadcast carousel. The Module IDs or module numbers that match the search results, and optionally a small piece of associated text, are sent to the client device. The module numbers and text are used as the basis for a menu entry display to the client device user. The STB application at the client device assembles the menu entries and displays them to the viewer of the client device or STB. The viewer navigates through the menu entries using the remote control associated with the client device and selects a menu item to view.

The Module ID or module number associated with the selected menu item are sent to the client device, the modules containing the resources pertaining to the viewer's selection are loaded, and the corresponding data is displayed on the client device display. In the case of a merchandise catalog, the data may comprise an item description, part number, price, and a picture. For real estate, the data may comprise a picture of the home, listing price, beds and baths, listing agent and contact information. In the case of the restaurant example, the data may comprise a picture of the restaurant, its name and address, phone number, and an excerpt from the menu.

Many products lend themselves to using a menu and video as a way of creating a particular ambiance and presenting their special features. The viewer selects a video relating to one of the returned matches using the remote control. The video request is sent to the server 102 via the back channel 107. The server 102 feeds the requested video file to the Application Streamer 104, which plays it into one of several streams (or tracks) allocated for this use. These streams/tracks are multiplexed together with the application stream/track. The Application Streamer 104 returns the stream/track PID (Packet ID) onto which the video has been multiplexed, to the server 102, which sends the PID to the application in the STB via a suitable channel. The receiving device then switches to the stream/track indicated by the PID and plays that selected video. In one embodiment, the video is a few seconds to a minute duration in order to conserve bandwidth that would otherwise be consumed by longer videos.

The server 102 then switches back to the application's stream/track after a predetermined time elapses or the video is released by all user's who have currently requested the video. For example, there may be more than one viewer who has concurrently requested a video of a particular house for sale. In an alternative embodiment, the video is captured at a specified time and location, or specified location in the carousel, and stored at the STB or client device hard drive, local memory or personal video recorder associated with the STB, from which the client device will display the video. The server may cease playing the video, that is, the server removes the video from the broadcast carousel after a predetermined time elapses, when receipt of the video is acknowledged by the client device(s) requesting the video. Alternatively, the video is removed from the broadcast after providing the video to the client device at a specified time and location in the broadcast. The video may also be sent to the client device over the back channel.

In one embodiment, available broadcast bandwidth is allocated only as needed. Several streams/tracks are configured in a pool and the application streamer allocates videos to the pool of tracks on an on-demand basis. The number and bandwidth of these streams/tracks may be determined by busy-hour demand, video quality, and/or video length.

In one embodiment, a thin client device may be used, that is, an STB with limited processing capability, such as the DCT-2000, without an integrated browser. Broadcast channel bandwidth and the anticipated load during the "busy hour" when bandwidth utilization is at a peak may dictate the size/length/compression requirements for the provided video. In a situation where the back channel is available to send video to the client device, the speed of the back channel, the latency of the broadcast, and the urgency of the viewer request versus the back channel speed and latency may be considered in a decision as to whether to send the video over the broadcast or over the back channel and when to schedule sending the video by the selection path.

In an embodiment where a video insertion product is not available, then everything except the video option may be used, or the video may be sent over the back channel. Development tools, such as the OpenTV™ SDK, OpenTV™ Publisher or OpenAuthor™ may be used to create the application as described herein. The assigning of Module IDs or module numbers may be added to the build code with the module IDs being sent to the server for inclusion in the database. In this scenario, any change in content (i.e., a new home listing) may require a new build.

While the forgoing discussion has used the example of an iTV system, the described embodiments may utilized in any distributed computer system. In another embodiment, a computer-readable medium, e.g., ROM, RAM, CDROM, flash, or any other memory now known or unknown, may contain instructions that when executed cause the computer to implement the methods and mechanisms described herein. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

While the foregoing disclosure is directed to particular embodiments, various modifications will be apparent to those skilled in the art. It is intended that all variations within the scope and spirit of the appended claims be embraced by the foregoing disclosure.

What is claimed is:

1. A method for conveying individualized content in a distributed computer system, said method comprising:
    broadcasting a plurality of modules in a broadcast carousel from a server to a plurality of client devices on a single channel, the plurality of modules in the broadcast carousel corresponding to a plurality of programs, each of said plurality of modules in the broadcast carousel having a unique module number, wherein said plurality of modules are not broadcast responsive to a client request;
    sending search criteria from a client device of the plurality of client devices to the server, subsequent to said broadcasting;
    receiving the search criteria at the server and identifying a qualifying module number which corresponds to the search criteria;
    sending the qualifying module number to the client device;
    receiving the qualifying module number at the client device; and
    retrieving a first module of said modules at the client device from the single channel, in response to matching the received qualifying module number to said first module.

2. The method of claim 1, further comprising displaying information corresponding to the first module on a display associated with said client device.

3. The method of claim 2, further comprising:
    a viewer generating a video request based upon said displayed information, said video being associated with said first module;
    sending said video request to said server; and
    sending a video corresponding to said video request from the server to the client device.

4. The method of claim 3, further comprising:
    inserting the requested video in a designated channel location in a broadcast;
    sending the designated channel location from the server to the client device; and
    using the designated channel location to retrieve the requested video from the broadcast at the client device.

5. The method of claim 3, further comprising:
    sending a broadcast time for the requested video to the client device;
    inserting the requested video in a broadcast at the broadcast time; and
    retrieving the video from the broadcast at the client device at the broadcast time.

6. The method of claim 3, further comprising continuously sending said video from the server until an acknowledgement of receipt is received by the server from the client device.

7. The method of claim 3, further comprising continuously sending said video from the server for a predetermined period of time.

8. The method of claim 1, further comprising sending a selected advertisement associated with the search request to the client device.

9. The method of claim 1, wherein each of said programs comprise a plurality of modules.

10. A distributed computing system for conveying individualized content, said system comprising:
    a server configured to broadcast in a broadcast carousel on a single channel a plurality of modules to a plurality of client devices, said plurality of modules in the broadcast carousel corresponding to a plurality of programs, each of said plurality of modules in the broadcast carousel having a unique module number, wherein said plurality of modules are not broadcast responsive to a client device request; and
    a client device coupled to receive said modules, wherein said client device is configured to:
        receive search criteria from a user; and
        send said search criteria to the server, subsequent to the server broadcasting said modules;
    wherein said server is further configured to receive the search criteria, identify a qualifying module number corresponding to the search criteria, and send the qualifying module number to the client device; and
    wherein said client device is further configured to:
        receive the qualifying module number; and
        retrieve a first module of said modules from the single channel, in response to matching the received qualifying module number to said first module.

11. The system of claim 10, wherein said client device is further configured to:
    generate a video request based upon information corresponding to the first module;
    send said video request to said server; and
    receive a video corresponding to said video request from the server, in response to said request.

12. The system of claim 11, wherein said server is further configured to insert the requested video in a designated channel location in a broadcast and send the designated channel location to the client device, and wherein the client device is further configured to use the designated channel location to retrieve the requested video from the broadcast.

13. The system of claim 11, wherein the server is further configured to send a broadcast time for the requested video to the client device and insert the requested video in a broadcast at the broadcast time, and wherein the client device is further configured to retrieve the video from the broadcast at the broadcast time.

14. The system of claim 11, wherein said server is configured to continuously convey said requested video until an acknowledgement of receipt is received from the client device.

15. The system of claim 10, wherein said server is further configured to:
    identify an advertisement associated with the search request; and
    send the advertisement to the client device.

16. A client device for use in a distributed computing system, said client device comprising:
    circuitry configured to receive a broadcast signal comprising a plurality of modules, the plurality of modules being received in a broadcast carousel on a single channel, and wherein the plurality of modules in the broadcast carousel correspond to a plurality of programs, each of said plurality of modules in the broadcast carousel having a unique module number, said plurality of modules not being broadcast responsive to a request from a client device;

processing circuitry configured to:
receive search criteria from a user;
send said search criteria to a server, subsequent to the broadcast of said modules;
receive from said server a qualifying module number, said number corresponding to the search criteria; and
retrieve a first module of said modules from the single channel, in response to matching the received qualifying module number to said first module.

17. The client device of claim 16, wherein said processing circuitry is further configured to:
generate a video request based upon information corresponding to the first module;
send said video request to a server; and
receive a video corresponding to said video request from the server, in response to said request.

18. A broadcast station for use in a distributed computing system, said broadcast station comprising:
a database; and
a server coupled to said database, wherein said server is configured to:
broadcast in a broadcast carousel on a single channel a plurality of modules to a plurality of client devices, said plurality of modules in the broadcast carousel corresponding to a plurality of programs, each of said plurality of modules in the broadcast carousel having a unique module number, wherein said plurality of modules are not broadcast responsive to a client request;
receive search criteria from one of said client devices;
identify a qualifying module number corresponding to the search criteria, and send the qualifying module number to the client device;
receive a video request from said client device, said request being based upon information corresponding to the qualifying module;
retrieve a video corresponding to said video request from said database, in response to said request; and
convey said retrieved video to said client.

19. The broadcast station of claim 18, wherein said server is further configured to:

identify an advertisement associated with the received search criteria;
retrieve the advertisement from the database; and
sending the advertisement to the client device.

20. A non-transitory computer readable medium containing program instructions, wherein said program instructions are executable to:
broadcast in a broadcast carousel on a single channel a plurality of modules from a server to a plurality of client devices, said plurality of modules in the broadcast carousel corresponding to a plurality of programs, each of said plurality of modules in the broadcast carousel having a unique module number, wherein said plurality of modules are not broadcast responsive to a client request;
send search criteria from a client device of the client devices to the server, subsequent to said broadcasting;
receive the search criteria at the server and identify a qualifying module number corresponding to the search criteria;
send the qualifying module number to the client device;
receive the qualifying module number at the client device; and
retrieve a first module of said modules from the single channel at the client device, in response to matching the received qualifying module number to said first module.

21. The medium of claim 20, wherein said program instructions are further executable to display information corresponding to the first module on a display associated with said client device.

22. The medium of claim 21, wherein said program instructions are further executable to:
generate a video request based upon said displayed information, said video being associated with said first module;
send said video request to said server; and
send a video corresponding to said video request from the server to the client device.

23. The medium of claim 22, wherein said program instructions are further executable to identify and send a selected advertisement associated with the search request to the client device.

* * * * *